Jan. 4, 1949.  G. A. KNAPP  2,458,007
SECURING BAND OR RING
Filed Aug. 20, 1946

INVENTOR.
George A. Knapp,
BY
Parker, Prochnow & Farmer,
Attorneys.

Patented Jan. 4, 1949

2,458,007

UNITED STATES PATENT OFFICE 2,458,007

SECURING BAND OR RING

George A. Knapp, Syracuse, N. Y., assignor to R. E. Dietz Company, New York, N. Y.

Application August 20, 1946, Serial No. 691,789

2 Claims. (Cl. 24—19)

This invention relates to securing or clamping rings or bands and more particularly to improvements in bezel rings such as are used for securing the glass lenses or front elements in place on the casings of electric lamps, and for more or less analogous purposes. Such bezel rings ordinarily consist of a split ring of grooved or flanged cross sectional form adapted to encircle and embrace adjacent peripheral portions of the lamp casing and lens, or other front element, and having a fastening screw connecting the ends of the split ring for contracting the ring to tightly clamp the parts to be secured together. This fastening screw usually passes through or operates in outwardly projecting perforated or tubular lugs on the opposing ends of the split ring for drawing the ends towards each other by tightening the screw.

There are various objections to bezel rings of the conventional type heretofore used. The perforated lugs for the fastening screws are commonly formed by separately made metal lug pieces which have to be riveted or otherwise fixed on the outer sides of the ends of the split ring. Such construction not only increases the expense and labor of making the rings, but due to unavoidable inaccuracies in manufacture and assembly, the lug pieces are apt to be improperly positioned on the ends of the ring so that the screw holes on the opposing ends of a ring will not be properly alined one with the other, and thus cause misalinement of opposing ends of the ring. Also, the lug pieces, unless they are of objectionably expensive or intricate formation, are such that the holes thereof through which the fastening screw passes, are located at or near one side edge of the ring so that the drawing action of the screw is more effective at one edge of the ring than the other and does not uniformly tighten the ring throughout its width. Furthermore, in such constructions the screw and portions of the lugs are located at a substantial distance outwardly from the outer face of the bezel ring where they form an objectionable projection on the lamp, and whereby the drawing force of the screw acts at a point radially outward away from the periphery of the bezel ring so as to tend, when tightened, to tip or deflect the ends of the ring inwardly or throw them out of circumferential alinement with each other. As a result of the use of such separately formed lug pieces with the screw holes located outwardly beyond the outer periphery of the ring and at its side edge, the tightening of the screw acts to twist or distort the ring and throw its adjoining ends out of alinement so as to detract from the appearance of the lamp. Also the ring is not contracted uniformly throughout its width, which interferes with the proper firm securing of the lens in place on the lamp casing.

One object of my invention is to provide a securing or clamping ring or the like of improved construction which will avoid the above noted objections in previous securing rings; in which the fastening screw lugs of the ring are formed integrally with the ring and are positioned so that the fastening screw is located close to the body of the ring and does not form an objectionable outward projection thereon; in which the band or ring is so formed that its fastening screw is located so as to evenly or uniformly apply contracting force throughout the full width of the ring or band; in which the fastening screw is located tangentially or approximately tangentially with the ring at its meeting ends so that its contracting force will be applied directly in the circumferential line of the body of the ring and not at a point radially outward therefrom; and in which a holding seat is provided for the screw nut which acts to hold the nut from turning and avoids the necessity for holding the nut by means of a tool when tightening the screw, and also avoids the necessity for the use of a lock washer for the screw.

The improved bezel ring or securing band constructed as herein disclosed gives various advantages among which may be mentioned the following:

It provides means for applying the force or tension of the fastening screw to the bezel ring in its normal circumferential direction, and avoids the setting up of forces or tension prevalent in previous bezel rings, which result in lug strains and bending, deforming or twisting action on the ring that produce gapping and uneven objective pressure. It also provides a seat or socket for the fastening screw nut which eliminates the need for a lock washer, and which allows the screw to be tightened to any desired pressure by the use of a screw driver alone, obviating the necessity for a holding wrench or pliers for the nut.

Further objects and advantages of the invention will appear from the following specification of the preferred embodiment of the invention shown in the accompanying drawings, and the novel features of the invention are set forth in the appended claims.

Figure 3:
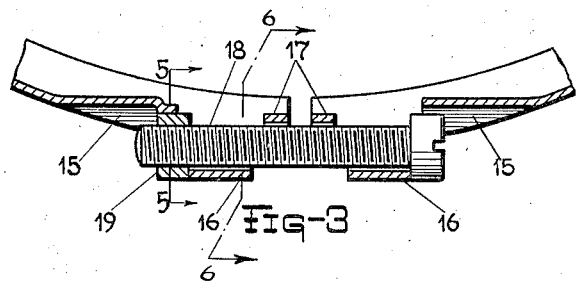
Fig. 3 is a longitudinal, sectional elevation on an enlarged scale on line 3—3, Fig. 1, showing the fastening screw device.
Figure 5:
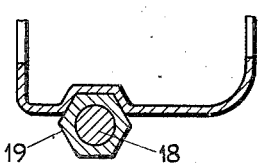
Figure 6:
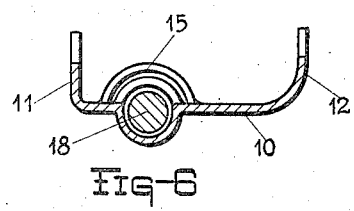

Figs. 5 and 6 are transverse sections on lines 5—5 and 6—6 respectively, Fig. 3.

The securing band or ring 10, with the exception of the hereinafter described formation of its end portions with which the fastening screw or bolt cooperates for contracting the band or ring may be of usual or suitable form, the bezel ring as illustrated in the drawings being of grooved or channel cross sectional form having inwardly extending flanges 11 and 12 at its opposite circumferential or side edges respectively adapted to engage or embrace peripheral portions of the casing 13 and lens or glass front 14 of a lamp, or other members to be secured together by the ring.

Each of the opposed end portions of the split bezel ring is provided between its side edges or flanges with an inbent or inwardly projecting portion which forms a socket or depression 15 in the outer side of the ring, and between the outer end of this depression and the end edge of the ring with a loop or lug 16 which projects outwardly from the outer face of the ring, and preferably also each end portion of the bezel ring is provided with an inbent or inwardly projecting lug or loop 17 located between the outer end of the lug or loop 16 and the end edge of the ring. These several socket and lug portions 15, 16 and 17 are arranged in line one in advance of the other lengthwise of the ring, and are preferably of substantially semi-circular shape in cross section, or transversely of the bezel ring, the lugs or loops 16 and 17 forming bearing or guide holes through which the fastening screw or bolt 18 for the ring passes, with the head of the bolt and its nut 19 each adapted to occupy one of the recesses 15 and bear against the inner end of the adjacent, outwardly projecting loop or lug 16 so that the ends of the ring can be drawn toward each other for contracting the ring by tightening the screw or bolt.

These semi-circular lugs or loops 16 and 17 project substantially equal distances outwardly and inwardly from the web or body of the ring so that the fastening screw or bolt 18 extending through the guide holes formed by the loops or lugs 16 and 17 will be located with its longitudinal axis approximately coincident with a line tangent to the circumference of the bezel ring at the split between its opposing ends. Thus, the fastening screw or bolt is not located outwardly away from or beyond the outer circumferential face of the ring, as in previous constructions, but is located approximately with one-half of its cross dimension outwardly and one-half inwardly relatively to the web of the ring, and when the bolt is tightened to contract the ring, its drawing force is applied approximately directly in the line or direction of the opposed ends of the web of the ring, instead of at a point radially outwardly beyond the other circumferential face of the ring.

The bezel ring shown is made of sheet metal and the socket and lug or loop portions 15, 16 and 17 are preferably formed by die pressing or stamping the web of the ring, which is slit transversely at 20, 21, the portion of the web between the pair of slits being pressed outwardly to form the outwardly directed lug or loop 16, and portions of the web at opposite sides of the pair of slits being pressed inwardly to form the depression 15 and the inwardly directed loop or lug 17. The bearing loops or lugs for the fastening screw are thus integral portions of the bezel ring and may be formed by a simple die or stamping operation which is relatively inexpensive and obviates the necessity for the more expensive and laborious operations of assembling and securing the previous, separately formed lugs on the bezel rings. The sockets or depressions 15 in the opposite end portions of the ring provide means for guiding the screw or bolt into the bearing lugs or loops and form sockets for the reception respectively of the screw or bolt head and nut.

Figure 1:
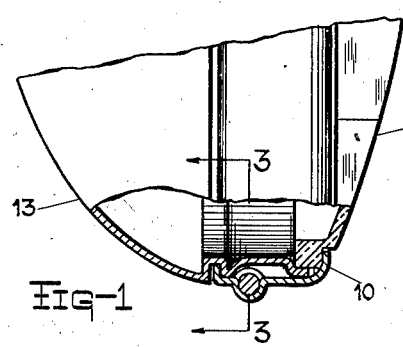
Fig. 1 is a fragmentary side elevation of a lamp equipped with a bezel ring embodying the invention for securing the lens or lamp front to the casing.
Figure 2:
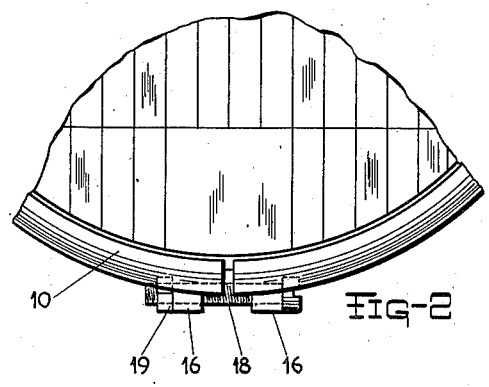
Fig. 2 is a partial front elevation thereof.
Figure 4:
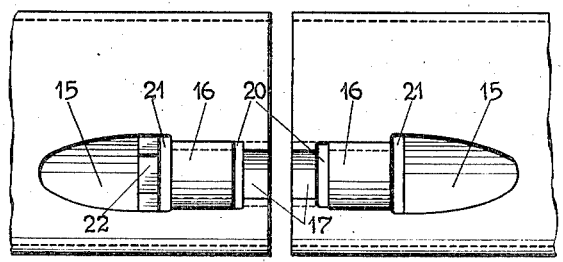
Fig. 4 is a face view of the opposed ends of the bezel ring with the fastening screw omitted.

The inner end 22 of the socket or depression 15 in one end of the ring, as shown in Figs. 2 and 4, is preferably made of semi-hexagonal or other appropriate non-circular form in which the screw nut 19 is adapted to seat and be held from turning. This greatly facilitates the fastening of the bezel ring in place, since the nut, which may be small, will be held from turning by engagement with the non-circular seat 22 and this obviates the necessity for the use of a tool or pliers for holding the nut from turning when tightening the screw to contract the ring.

I claim as my invention:

1. A contractible split securing ring including a fastening screw connecting the opposing end portions of the ring for contracting the ring, each of said portions having a depression and having between said depression and the extremity of said end portion lengthwise alined integral lugs of approximately semicircular form which respectively project inwardly and outwardly from said end portion and together form a bearing and guide passage surrounding and through which said screw passes, said screw having a head which occupies one of said depressions and engages the adjacent lug, and a screw threaded nut on said screw which occupies said second depression and engages the lug adjacent thereto.

2. A contractible split bezel ring constructed according to claim 1, in which said inwardly projecting lug of each end portion is located between said outwardly projecting lug and the extremity of said end portion.

GEORGE A. KNAPP.

REFERENCES CITED

The following references are of record in the file of this patent:

UNITED STATES PATENTS

| Number | Name | Date |
|---|---|---|
| 1,583,677 | Edelmann | May 4, 1926 |